United States Patent [19]
Stein et al.

[11] Patent Number: 4,994,299
[45] Date of Patent: Feb. 19, 1991

[54] SUBSTANTIALLY ODOR FREE, UV CURABLE ORGANOPOLYSILOXANE RELEASE COATING COMPOSITIONS AND COATING METHOD

[75] Inventors: Judith Stein, Schenectady, N.Y.; Tracey M. Leonard, Essex Junction, Vt.

[73] Assignee: General Electric Company, Schenectady, N.Y.

[21] Appl. No.: 369,900

[22] Filed: Jun. 22, 1989

[51] Int. Cl.$^5$ .......................... C08G 77/06; B08D 3/06
[52] U.S. Cl. ..................................... 427/54.1; 522/31; 522/99; 528/14; 528/23; 427/386; 427/387
[58] Field of Search ...................... 522/31, 99; 528/14, 528/23; 427/54.1, 386, 387

[56] References Cited

U.S. PATENT DOCUMENTS

| | | | |
|---|---|---|---|
| 4,279,717 | 7/1981 | Eckberg et al. | 522/31 |
| 4,370,358 | 1/1983 | Hayes et al. | 522/31 |
| 4,585,670 | 4/1986 | Liu | 522/99 |

Primary Examiner—Marion E. McCamish
Assistant Examiner—Susan Berman
Attorney, Agent, or Firm—William A. Teoli; James C. Davis, Jr.; William H. Pittman

[57] ABSTRACT

UV curable epoxysilicone compositions are provided which can be used to impart improved release characteristics to plastic or paper substrates in an odor-free manner. Polyaryloniumhexafluorometalloid salts are used as photoinitiators. The UV curable compositions have condensed epoxyorganosiloxy units and haloarylalkylsiloxy units and have been found to be effective as control release agents when blended with epoxysiloxanes.

9 Claims, No Drawings

SUBSTANTIALLY ODOR FREE, UV CURABLE ORGANOPOLYSILOXANE RELEASE COATING COMPOSITIONS AND COATING METHOD

CROSS REFERENCE TO RELATED APPLICATION

References made to copending application of Riding et al for Silicone Release Coating Compositions, Ser. No. 25,986, filed July 29, 1988, Eckberg et al, for Ultraviolet Radiation Curable Epoxy-Silicone/Polyol Systems application, 60SI-1267, filed on or about Apr. 3, 1989, and Stein et al for UV Curable Epoxy Silicone Compositions, RD-19,356, filed concurrently herewith, which are assigned to the same assignee as the present invention and incorporated herein by reference.

BACKGROUND OF THE INVENTION

The present invention relates to substantially odor free, UV curable organopolysiloxane compositions useful as release coatings. More particularly, the present invention relates to the use of a polydiorganosiloxane having condensed epoxyorganosiloxy units and haloarylalkylsiloxy units which can provide for substantially odor free UV curable organopolysiloxane release coating compositions.

In copending application Ser. No. 225,986, there is described silicone release coatings having improved differential release characteristics. A principal feature of the release performance of such coating compositions is the presence of phenolalkyl radicals attached to silicon by carbon-silicon bonds resulting from the platinum catalyzed hydrosilylation of allylphenol onto condensed siliconhydridesiloxy units. Although a controlled release effect can be achieved with such silicone coating compositions, it has been found that residual amounts of unreacted allylphenol are often present in the cured coating resulting in an unpleasant phenolic odor.

In copending application RD-19,356, filed concurrently herewith, improvements in controlled release characteristics of UV curable silicone compositions are achieved without the odor disadvantages of residual allylphenol, by using either $C_{(8-20)}$ alkyl substituted phenol monomers or readily distillable phenolalkyl substituted disiloxanes as controlled release additives (CRA's).

It would be desirable therefore to provide additional odor-free epoxysilicones, or CRA's for epoxysiloxanes, which would be capable of providing odor-free UV curable epoxysilicone compositions having controlled release characteristics.

SUMMARY OF THE INVENTION

The present invention is based on the discovery that epoxysiloxanes having condensed siloxy units substituted with haloarylalkylene groups attached to silicon by carbon-silicon bonds can provide substantially odor-free UV curable organopolysiloxane compositions exhibiting controlled release characteristics when cured on a paper or plastic substrate.

STATEMENT OF THE INVENTION

There is provided by the present invention, a substantially odor-free, UV curable, organopolysiloxane release coating composition comprising (A) poly(epoxyhaloarylalkylsiloxane) selected from the class consisting of (i) an epoxyhaloarylalkylsiloxane consisting essentially of about 20 to about 100 condensed siloxy units which includes from about 76 to about 94 mole percent of diorganosiloxy units of the formula, $$(R)_2SiO, \tag{1}$$

from about 5 to 12 mole percent of epoxyorganosiloxy units of the formula, $$RR^1SiO, \tag{2}$$

from about 1 to about 12 mole percent of haloarylalkylsiloxy units of the formula, $$RR^2SiO, \tag{3}$$

(ii) a blend of (i) and epoxysiloxane consisting essentially of about 20 to about 100 condensed siloxy units which includes from about 88 to about 95 mole percent of the diorganosiloxy units and from about 5 to about 12 mole percent of the epoxyorganosiloxy units, and (i) and (ii) of (A) are present therein in an amount which is sufficient to maintain from about 76 to about 94 mole% of the diorganosiloxy units, from about 5 to about 12 mole% of the epoxyorganosiloxy units and from about 1 to about 12 mole% of the haloarylalkylsiloxy units and (B) an effective amount of a polyaryloniumhexafluorometalloid salt selected from diaryliodonium salts and triarylsulfonium salts, where R is a member selected from the same or different $C_{(1-13)}$ monovalent hydrocarbon radicals, and $C_{(1-13)}$ monovalent hydrocarbon radicals substituted with radicals inert during condensation, $R^1$ is a monovalent epoxy functional organic radical and $R^2$ is a monovalent haloarylalkyl radical.

Preferably, the epoxyhaloarylalkylsiloxane consists essentially of from about 10 to about 50 condensed siloxy units of formulas 1-3. It can be used as a controlled release additive (CRA) when combined with the epoxysiloxane consisting essentially of units of formulas (1) and (2) free of condensed haloarylalkylsiloxy units of formula (3).

Radicals included within R of formulas 1-3, are, for example $C_{(1-8)}$ alkyl radicals, such as methyl, ethyl, propyl, butyl, pentyl, alkenyl radicals such as vinyl, alkyl, cycloaliphatic radicals, for example cycloheptyl cyclohexyl; substituted alkyl, for example trifluoropropyl, cyanoethyl; aryl radicals, such as phenyl, tolyl, xylyl, haloaryl, for example chlorophenyl. Radicals included within $R^1$ of formula (2) are for example, ethylepoxycyclohexyl, propylglycidyl ether, and 1-methyl-4-isopropyl epoxycyclohexyl. Radicals included within $R^2$ of formula (3) are, for example, ethylchlorophenyl, ethylbromophenyl and propylchlorophenyl.

The polyaryloniumhexafluorometalloid salts which can be used in the practice of the present invention include group VIa aromatic sulfonium salts as shown by U.S. Pat. No. 4,058,401 and U.S. Pat. No. 4,161,478, Crivello, which are incorporated herein by reference and hexafluorodiaryliodonium salts shown by Crivello U.S. Pat. No. 4,173,551 which is incorporated herein by reference.

Some of the triarylsulfonium salts are, for example, triphenylsulfoniumhexafluoroarsenate, triphenylsulfoniumhexafluoroantimonate and triarylsulfoniumhexafluorophosphate. Among the diaryliodonium salts which can be used are, for example, diphenyliodoniumhexafluoroarsenate, and diphenyliodoniumhexafluorophosphate. In addition to the aforementioned arylonium salts there also can be used arylonium salts selected from the class consisting of hexafluorophosphates, hexafluoroarsenates and hexafluoroantimonates having at least one aryl radical substituted with a nuclear bound OR group attached to the aryl nucleus by a carbon-oxygen linkage, where R is an alkyl radical having at least 8 carbon atoms. Reference is made to copending application Ser. No. 171,063, filed Mar. 21, 1988 for Non-Toxic Aryl Onium Salts, UV Curable Coating Compositions and Packaging Use, Crivello et al, which is incorporated herein by reference, which shows additional hexafluoroonium salts which can be employed in the practice of the present invention. An effective amount of the aryl onium salts which can be used is, for example, from 0.1% to 1.5% by weight and preferably 0.25% to 1% by weight based on the weight of release coating composition.

The poly(epoxyhaloarylalkylsiloxane) or epoxyhaloarylalkylsiloxanes used in the practice of the present invention can be made by effecting reaction between epoxide monomers having ethylenic unsaturation, and ethylenically unsaturated halogenated aromatic compounds, with organo-hydrogenpolysiloxane in the presence of a catalytic amount of a precious metal, such as a platinum catalyst. Included within the ethylenically unsaturated epoxy monomers which can be employed to make the epoxysilicones used in the practice of the present invention are commercially available materials such as 1-methyl-4-isopropenylcyclohexene oxide, 2,6-dimethyl-2,3-epoxy-7-octene, 1,4-dimethyl-4-vinylcyclohexene oxide and vinylcyclohexene monoxide. Vinylcyclohexene oxide is the preferred ethylenically unsaturated epoxide which can be used. Included among the ethylenically unsaturated halogenated aromatic compounds are, for example, chlorostyrene and bromostyrene.

Addition between the ethylenically unsaturated monomers and the SiH functional groups of the organohydrogen polysiloxane can be effected in accordance with the procedure shown by Eckberg U.S. Pat. No. 4,279,717, employing an effective amount of the platinum metal catalyst. In order to maintain the desired mole percent range of epoxy functionality and haloarylalkyl functionality in the epoxyhaloarylalkylsiloxane, there can be used various organohydrogenpolysiloxanes which preferably are methylhydrogenpolysiloxane fluids. For example, in instances where about 10 mole percent of epoxyorgano functional siloxy units, and about 10 mole percent of haloarylalkylsiloxy units are desired, a methylhydrogenpolysiloxane can be used having a chain length of about 100 chemically combined siloxy units and about 80 mole percent of dimethylsiloxy units and about 20 mole percent of methylhydrogensiloxy units chain-stopped with dimethylhydrogensiloxy units or trimethylsiloxy units.

The organohydrogenpolysiloxane used in preparing the epoxyhaloarylalkylsiloxane can consist of chemically combined dimethylsiloxy units or diphenylsiloxy units, or methylphenylsiloxy units and organosiloxy units having hydrogen attached to silicon, such as methylsiloxy units or phenylsiloxy units and chain-stopped with triorganosiloxy units, such as trimethylsiloxy units or diorganosiloxy units, such as dimethylhydrogensiloxy units having from about 10 to about 40 condensed siloxy units as previously defined. Hydrosilylation can be effected by the use of a platinum catalyst for example, chloroplatinic acid, finely divided platinum metal, platinum metal on a carrier, such as carbon as shown by Baily, U.S. Pat. No. 2,970,150, platinum catalyst is shown by Ashby, U.S. Pat. Nos. 3,159,601 and 3,159,662, Lamoreaux, U.S. Pat. No. 3,220,972 and Karstedt, U.S. Pat. No. 3,775,452 all of which are incorporated herein by reference.

UV curable organopolysiloxane compositions of the present invention can be applied to various substrates by conventional means, such as roller coating, dip coating and spraying. The UV curable organopolysiloxane compositions can be applied, for example, on paper, metals, foils, glass, as well as polymer coated papers such as polyolefin coated kraft paper, polyolefin films, such as polyethylene and polypropylene films and polyester films.

Cure of the applied coatings can be effected by photopolymerization of the UV curable organopolysiloxane compositions upon exposure to a radiation source within the ultraviolet and visible regions. Some of the radiation sources are, for example, mercury, xenon, carbon arc and tungsten filament lamps, sunlight, etc. Exposures can be from less than one second to 10 minutes of more depending upon the materials to be polymerized and photocatalysts employed. Electron beam irradiation also can be used.

In order that those skilled in the art will be better able to practice the present invention, the following examples are given by way of illustration and not by way of limitation. All parts are by weight unless otherwise specified.

EXAMPLE 1

A controlled release agent (CRA) was prepared in accordance with the practice of the invention, by adding dropwise, 1.039 grams of chlorostyrene to a mixture heated to 65° C. consisting of 10 grams of a siliconhydride fluid consisting of about 20 condensed dimethylsiloxy units, 3 condensed methylhydrogensiloxy units and chain-stopped with trimethylsiloxy units, and two drops of a platinum catalyst in the form of a reaction product of chloroplatinic acid and octanol. The resulting mixture was stirred for one half hour and then 0.9375 grams of vinylcyclohexene monoxide was added dropwise. After three hours, there were then added, 0.1 gram of hexene, 0.5 gram of tetramethylurea, 0.5 gram of dodecanethiol. The solvent was removed under vacuo and light ends were removed by stripping at 120° C. Based on method of preparation, there was obtained a polymethylsiloxane fluid having chemically combined epoxycyclohexenylethylsiloxy units, and chlorophenylethylsiloxy units.

Several blends were made by mixing the above CRA and an epoxypolydimethylsiloxane having 7 mole percent of methylepoxycyclohexylethylsiloxy units and a viscosity of 250 centipoise at 25° C. The blends were diluted with acetone/hexane to 20% solids by weight and catalyzed with 1–3% by weight of a (4-octylphenyl) phenyliodoniumhexafluoroantimonate as part of a 1:1 mixture with 2-ethyl-1,3--hexanediol. The resulting release coating compositions were then applied onto polyethylene kraft using a coating rod and dried and cured by exposure to a mercury vapor lamp at 300 watts/at 50 feet/minute. Laminates were prepared from the resulting coated liner with an aggressive solvent cast rubber based (SBR) pressure sensitive adhesive. The laminates were separated using a pull of 300 inches/minute 180° angle. The following release values in units grams/2 inches were obtained, where UE is the epoxypolydimethylsiloxane free of the CRA.

TABLE 1

| g of CRA | g of UE | Release 3 week data |
|---|---|---|
| — | 1.0 | 45–50 |
| 0.25 | 0.75 | 80–90 |
| 0.50 | 0.50 | 145–155 |
| 0.75 | 0.25 | 175–185 |
| 1.0 | — | 195–205 |

The above results show that epoxysiloxane fluids having condensed methyl-chlorophenylethylsiloxy units and condensed methylepoxycyclohexylethylsiloxy units can function as a valuable CRA when blended with conventional epoxypolydimethylsiloxanes. In addition, the uncured UV curable coating compositions, as well as the cured coatings were substantially odor free.

Although the above example is directed to only a few of the very many variables which can be used in the practice of the present invention, it should be understood that the present invention is directed to a much broader variety of UV curable organopolysiloxane compositions which contain various epoxysilicone fluids having condensed organohaloarylalkylsiloxy units and condensed organo-epoxyorganicalkylsiloxy units as set forth in the description preceding this example.

What is claimed is:

1. A substantially odor-free, UV curable organopolysiloxane controlled release coating composition comprising,
   (A) an epoxyhaloarylalkylsiloxane having from about 20 to about 100 condensed siloxy units, where the epoxyhaloarylalkylsiloxane is a member selected from the class consisting of,
      (i) an epoxyhaloarylalkylsiloxane consisting of about 76 to about 94 mole % of diorganosiloxy units of the formula, $(R)_2SiO$, from about 5 to about 12 mole % of epoxyorganosiloxy units of the formula, $RR^1SiO$, from about 1 to about 12 mole % of haloarylalkylsiloxy units of the formula, $RR^2SiO$, and the sum of the condensed siloxy units in the epoxyarylalkylsiloxane is 100 mole %, and
      (ii) a blend of (i) and epoxysiloxane consisting of about 88 to about 95 mole % of the diorganosiloxy units of (i) and from about 5 to about 12 mole % of the epoxyorganosiloxy units of (i), and the epoxysiloxane of (ii) is utilized in the blend in an amount which is sufficient to maintain about 76 to about 94 mole % of the diorganosiloxy units, about 5 to about 12 mole % of the epoxyorganosiloxy units and from about 1 to about 12 mole % of the haloarylalkylsiloxy units and,
   (B) from 0.1% to 1.5% by weight based on the weight of the UV curable organopolysiloxane coating composition of a polyaryloniumhexafluorometalloid salt selected from the class consisting of diaryliodonium salts and triarylsulfonium salts, where R is a member selected from the same or different $C_{(1-13)}$ monovalent hydrocarbon radicals and $C_{(1-13)}$ monovalent hydrocarbon radicals substituted with radicals inert during condensation, $R^1$ is a monovalent epoxy functional organic radical and $R^2$ is a monovalent haloarylalkyl radical.

2. A substantially odor free composition in accordance with claim 1, where the polyaryloniumhexafluorometalloid salt is a diaryliodoniumhexafluoroantimonate salt.

3. A substantially odor-free composition in accordance with claim 1, where the polyaryloniumhexafluorometalloid salt is a triarylsulfononium salt.

4. A substantially odor-free composition in accordance with claim 1, where the poly(epoxyhaloarylalkylsiloxane) is a blend of the epoxyhaloarylalkylsiloxane consisting essentially of from about 20 to about 40 condensed siloxy units, and epoxysiloxane consisting essentially of from about 20 to about 100 condensed siloxy units.

5. A substantially odor-free composition in accordance with claim 1, where R is methyl, $R^1$ is epoxycyclohexylethyl and $R^2$ is chlorophenylethyl.

6. A substantially odor-free composition in accordance with claim 1, where the poly(epoxyhaloarylalkylsiloxane) is the epoxyhaloarylalkylsiloxane.

7. A substantially odor-free composition in accordance with claim 6, where the epoxyhaloarylalkylsiloxane is an epoxychlorophenylethylsiloxane.

8. A substantially odor-free method for imparting controlled release characteristic onto a paper or plastic substrate which comprises,
   (1) treating a plastic or paper substrate with a UV curable organopolysiloxane composition and,
   (2) effecting the cure of the treated plastic or paper substrate by exposing it to UV, where the UV curable organopolysiloxane composition is a substantially odor-free, UV curable, organopolysiloxane release coating composition comprising (A) poly(epoxyhaloarylalkylsiloxane) selected from the class consisting of
      (i) an epoxyhaloarylalkyl siloxane consisting essentially of about 20 to about 100 condensed siloxy units selected from about 76 to about 94 mole percent of diorganosiloxy units of the formula, $(R)_2SiO$, from about 5 to about 12 mole percent of epoxyorganosiloxy units of the formula $RR^1SiO$, from about 1 to about 12 mole percent of haloarylalkylsiloxy units of the formula $RR^2SiO$, (ii) a blend of (i) and epoxysiloxane consisting essentially of about 20 to about 100 condensed siloxy units which includes from about 88 to about 95 mole percent of the diorganosiloxy units and from about 5 to about 12 mole percent of the epoxyorganosiloxy units, and (i) and (ii) of (A) are present therein in an amount which is sufficient to maintain from about 76 to about 94 mole% of the diorganosiloxy units, from about 5 to about 12 mole% of the epoxyorganosiloxy units and from about 1 to about 12 mole% of the haloarylalkylsiloxy units and (B) an effective amount of a polyaryloniumhexafluorometalloid salt selected from diaryliodonium salts and triarylsulfonium salts, where R is a member selected from the same or different $C_{(1-13)}$ monovalent hydrocarbon radicals and $C_{(1-13)}$ monovalent hydrocarbon radicals substituted with radicals inert during condensation, $R^1$ is a monovalent epoxy functional organic radical and $R^2$ is a monovalent haloarylalkyl radical.

9. A method in accordance with claim 8, where the substrate is a polyethylene kraft.

* * * * *